(12) United States Patent
Schreck et al.

(10) Patent No.: US 7,945,840 B2
(45) Date of Patent: May 17, 2011

(54) MEMORY ARRAY ERROR CORRECTION APPARATUS, SYSTEMS, AND METHODS

(75) Inventors: John F. Schreck, Lucas, TX (US); Todd A. Dauenbaugh, Richardson, TX (US)

(73) Assignee: Micron Technology, Inc., Boise, ID (US)

( * ) Notice: Subject to any disclaimer, the term of this patent is extended or adjusted under 35 U.S.C. 154(b) by 1079 days.

(21) Appl. No.: 11/705,190

(22) Filed: Feb. 12, 2007

(65) Prior Publication Data

US 2008/0195894 A1 Aug. 14, 2008

(51) Int. Cl.
*H03M 13/00* (2006.01)
(52) U.S. Cl. ......................... 714/762; 714/763
(58) Field of Classification Search .................. 714/762, 714/763
See application file for complete search history.

(56) References Cited

U.S. PATENT DOCUMENTS

| | | | | |
|---|---|---|---|---|
| 5,590,304 A * | 12/1996 | Adkisson | ....................... | 711/100 |
| 5,878,059 A | 3/1999 | Maclellan | | |
| 5,974,514 A * | 10/1999 | Andrewartha et al. | ........ | 711/166 |
| 7,464,320 B2 * | 12/2008 | Nagai et al. | .................... | 714/763 |
| 7,610,542 B2 * | 10/2009 | Nagai | ........................... | 714/763 |
| 2006/0200728 A1 | 9/2006 | Nagai et al. | | |
| 2007/0288707 A1 * | 12/2007 | Tremaine | ...................... | 711/155 |

FOREIGN PATENT DOCUMENTS

GB 2289779 11/1995
WO WO-2008100462 A2 8/2008

OTHER PUBLICATIONS

"Office Action received Mar. 3, 2011 in regards to Korean Application No. 10-2009-7018940". English translation attached.

* cited by examiner

*Primary Examiner* — Sam Rizk
(74) *Attorney, Agent, or Firm* — Dorsey & Whitney LLP

(57) ABSTRACT

Various embodiments include apparatus, methods, and systems that operate to extend the processes of reading, modifying, and writing data stored in or being provided to a memory array without interrupting a continual stream of data to be written into the memory array. Embodiments may include an apparatus comprising a memory array, and an error code module coupled to the memory array with a data buffer having a plurality of data burst registers operable to receive a plurality of data bursts to be written to the memory array on a corresponding plurality of consecutive clock cycles. The error code module is operable to perform a read/modify/write process on each of the plurality of data bursts within a time period no longer than a period of two consecutive cycles of the plurality of consecutive clock cycles.

48 Claims, 5 Drawing Sheets

MEMORY ARRAY ERROR CORRECTION APPARATUS, SYSTEMS, AND METHODS

TECHNICAL FIELD

Various embodiments described herein relate generally to memory devices, including memory devices having error correction codes (ECC) associated with data stored in dynamic random access memory (DRAM).

BACKGROUND

Semiconductor memory devices are integrated circuits in which information may be stored and from which information may be recalled when desired. Each memory device is built from a plurality of memory cells in which each memory cell has the capacity to store at least one binary bit of data. Essentially, the cells are located at intersections of wordlines and bitlines (e.g., visualized as rows and columns of an array). Cells may store a single bit of data as a logical "1" or a logical "0" and may sometimes be individually accessed or addressed. Cells may sometimes be addressed using two multi-bit numbers. When this scheme is used, the first multi-bit number, or row address, may identify the row of the memory array in which the memory cell is located. The second multi-bit number, or column address, may identify the column of the memory array in which the desired memory cell is located. Each row address/column address combination may correspond to a single memory cell.

Recalling data from memory arrays may not be perfectly accomplished in every case. Thus, error detection and correction schemes may be used to enhance memory array data storage reliability. However, most error correction schemes penalize overall operation of the array, perhaps in terms of circuit real estate and/or operational speed. Therefore, improved mechanisms for error detection/correction are needed.

DETAILED DESCRIPTION

Figure 1:
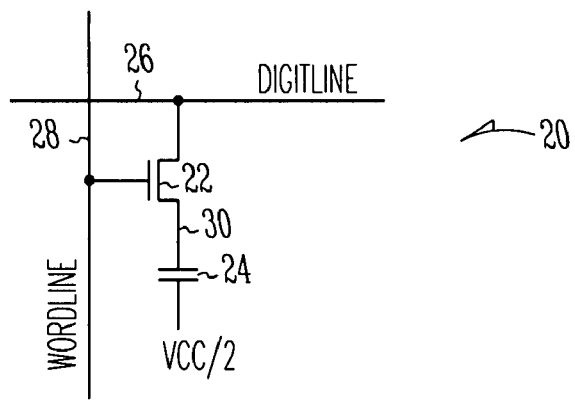
FIG. 1 is a prior art DRAM memory cell.

This document describes apparatus, methods, and systems that can be used to extend the processes of reading, modifying, and writing data in a memory array without interrupting a substantially continual stream of data to be received and written into the memory array. Such memory arrays may form a part of many different types of commercially available memory devices, as noted below.

As disclosed in further detail below, in various embodiments a column cycle associated with memory operations is divided in two halves. A column cycle refers to an operation, including but not limited to, a write operation associated with a particular address.

A column refers to a group of memory cells coupled to a particular word line that are selected when an address associated with the word line and an individual memory cell or a group of memory cells coupled to the word line are selected by the application of the address to the column select input of the memory array.

A column cycle may include reading from or writing to one or a plurality of memory cell locations within the memory array. The cells are selected by the application of the address to the memory device containing the memory cells. The column cycle may be divided into a first half that includes a read, and a second half that includes a write. In various embodiments, these two halves are spaced apart by another portion of a column cycle related to another address in the memory array. This splitting of the column cycle into two halves and spacing apart the two halves by an intervening or interleaved portion of a column cycle from a different address allows error correction and check bit re-generation to occur for the split column cycle data during the time the column cycle related to different address in the memory array is taking place.

Effectively, using this scheme, the read, modify, and write operation related to the data and check bits associated with the data and the first memory address is extended over three column cycles. In order for this operation to not delay normal column access performance, one column cycle may be performed in half, or less than half of the time a non-ECC design would use in performing a normal write or read.

Modern memory devices may be constructed according to a variety of operational types, such as a DRAM, static random access memory (SRAM), video random access memory (VRAM), erasable programmable read only memory (EPROM), electrically erasable and programmable read only memories (EEPROMS), dynamic electrically alterable programmable read only memory (DEAPROM), flash memory, and other semiconductor memory devices Each type of memory device has certain characteristics that dictate how these various types of memory devices operate. For example, dynamic random access memory is categorized as a volatile memory device since the DRAM loses its stored data when the power supply is removed. In addition, DRAM is structurally simplistic as only one transistor and a capacitor are required to store each bit in the DRAM memory device. However, because a capacitor is not an ideal device and is subject to leakage, the DRAM memory requires that the capacitor charge be refreshed periodically. The overhead dedicated to refresh operations is acceptable in many instances because of the very high density afforded by a DRAM memory.

The following described embodiments of the invention are described as applied to a DRAM memory structure. However, those skilled in the art will readily recognize that various embodiments of the invention may be practiced with a wide variety of memory types, including each of those named above (e.g., SRAM, VRAM, etc.). The use of a DRAM memory design as a foundation for the discussion is by way of simplified illustration only, and not by limitation.

The charge in a DRAM memory cell is used to represent the value, and thus the data, stored in the memory cell. Over a period of time, the charge in a DRAM memory cell will leak away, and the memory content may be lost. Thus, DRAMs are periodically "refreshed" so they will not lose the data stored in the memory.

In refreshing the DRAM memory, a process is used that cycles through the memory cells and restores each memory cell to a charge representative of the value of the data bit stored in the memory cell. Various schemes may be employed for this refreshing process, including dividing the memory array into blocks, wherein each of the blocks is refreshed at different times. In other schemes, the entire memory array may be refreshed at the same time. In the schemes where the memory is divided into blocks that are refreshed at different times, which blocks have been refreshed, and how long it has been since a block has been refreshed, is tracked. This is because the leakage of the charge maintained in the memory cells occurs at some rate, which may vary from memory cell to memory cell. After a certain period of time, the amount of leakage that has occurred in one or more of the memory cells may be such that the amount of charge in the memory cell now represents a different state than the original. In other words, the data bit has changed state due to leakage, the data is lost, and at least that portion of the data stored in the memory is corrupt.

Since different bits within the memory cell leak at different rates, all cells are usually refreshed in a time that is less than the worst case bit in the memory array, as represented by the memory cell that will leak charge and change state in the least amount of time. Because the refresh process consumes power each time it is performed, the more frequently the refresh process is performed, the more overall power the memory device will consume. Thus, if the refresh operation is performed at a time interval less than the worst case bit in the memory cell, an increase in the overall power consumption of the memory device will occur, as compared to a refresh time interval that is greater than the time for the worst case memory cell to change state due to leakage.

In addition, during the time a refresh is being performed, reading from and writing to the memory (or at least to the particular block or blocks of memory being refreshed) can not be performed. Thus, the memory (or at least the portion thereof being refreshed) is not available for read or write operations. The refreshing of the DRAM memory represents lost time for reading from and writing to the DRAM memory, and therefore imposed an overall performance penalty on the memory device. The less often the refresh is performed, the less the performance penalty imposed by the refresh requirements to the memory device.

In various embodiments, error correction codes may be used to detect corruption of data due to leakage. When data is presented for storage into the memory array, an error correction code is generated based on the values present in the data to be stored. Various types of error correction codes are known to those skilled in the art.

One type of error correction code is known as a Hamming code, which can be generated for a plurality of data bits, and may later indicate if one of the data bits has been altered. Hamming codes have the addition advantage of being able to identify which one of the data bits in the plurality of data bits has a been altered. Use of Hamming codes thus allows correction of a particular bit within a given group of bits that has been altered, allowing restoration of the given group of bits (with a single altered bit) to the original state of the data prior to the corruption.

The number of bits required to form the Hamming code for a particular plurality of data bits depends on the number of individual bits in the plurality of data bits. Using Hamming codes as error correction codes, a memory device may be organized into the following data configurations, among many:

8 data bits and 4 check bits
  16 data bits and 5 check bits
  32 data bits and 6 check bits.

Using the 16 data bits and 5 check bits configuration as an example, a Hamming code including 5 check bits may be generated for each group of data bits including no more than 16 data bits, and thus provide an error correction code for each of these pluralities of data bits. The error correction code may be stored in the memory array as additional bits along with the 16 data bits, for a total of 21 bits. In some embodiments, the 5 check bits may be stored in the next 5 memory cells at the same memory location as the 16 data bits in the memory array. In some embodiments, the 5 check bits may be stored, along with other error correction codes for other data, in a part of the memory array separate from the area of the memory array where the data is stored. In various embodiments, a separate address is generated for the error correction code, and is associated with the address where the data associated with that error correction code is stored.

These configurations for data and associated check bits allow detection and correction of instances where there is a failing of one bit in the data bits. The array overhead for each of these data configurations as described above is approximately 50 percent for the 8 data bits plus 4 check bits configuration, approximately 31 percent for the 16 data bits plus the 5 check bits configuration, and approximately 19 percent for the 32 data bits plus 6 check bits configuration. The determination as to which data configuration may be used in any application of the memory device depends on various factors, such as die real estate site penalty, power penalty, and speed penalty (e.g., to read or write through the logic used to perform the correction).

In various embodiments, the refresh cycle is performed within a time interval of no more than 64 milliseconds. In such embodiments, each bit of the memory needs to be refreshed within no more than 64 milliseconds from last time the bit was refreshed. Generally, at a refresh cycle interval of 64 milliseconds, the refresh cycle interval may be less than any one of the times for a worst case time of a memory cell in the memory array to be altered due to leakage. Therefore, in most cases there may be little to no use of the error correction codes to detect and change corrupted data.

However, for a large number of bits included in memory, for example a one giga-byte memory, only a small fraction of the memory cells will actually have a leak rate such that a change in the state of the data stored at the memory cell occurs within the given refresh cycle interval of 64 milliseconds. The distribution of the actual times for each of the memory cells in the one giga-byte memory to leak charge to the point where the value stored in the memory cell would change state may be represented by a distribution including a tail. The tail of the distribution may begin near a time period at or greater than 64 milliseconds. However, the portion of the total bits included in the distribution at the time period between just over 64 milliseconds and up to a time period of 128 milliseconds may be a small percentage of the total number of memory cells in the memory array. In various embodiments, the number of memory cells included in the tail of the memory distribution between 64 milliseconds and up to 128 milliseconds may be less than one percent of the total memory cells included in the memory array.

In addition, the number of data bits that may be grouped together and stored as data bits associated with the same error correction code and experiencing two or more memory cells within that data group where the number of data bits is stored that would change state due to leakage (e.g., two or more corrupt cells) in less then the 128 milliseconds refresh time interval is one or more magnitudes less than the one percent figure for the single bit error rate described above.

In smaller data groups (e.g., an 8 data bit group plus the 4 check bits), the probability of having two bad data bits in that particular group are less than the probability of having two bad data bits in a larger data group (e.g., a group including 16 data bits). Similarly, the probability of having two bad bits in a single data group is less in a 16-bit data group than there would be in a still larger data group, for example in a 32-bit data group. In various embodiments, the refresh time for an 8 data bit group with 4 check bits may be up to and including a 700 millisecond refresh cycle time interval, and for a 32 data bit group with 6 check bits, a 600 millisecond refresh cycle time interval may be used.

In various embodiments, the refresh time intervals for the locations in the memory array storing the error correction codes may be less than that used as the refresh time interval used to refresh the locations in the memory array storing the data bits. In some embodiments, the memory cells in the memory array storing the error correction codes may be refreshed using a 64-millisecond time interval, while the memory cells in the memory array storing the data bits may be refreshed at a time interval longer than 64 milliseconds.

By using Hamming codes, or other error correction codes associated with data stored in a memory array, the refresh time interval may be increased. In these embodiments, the area penalty imposed by the added check bits is offset by the power savings allowed by the extension of the refresh cycle times. The extended refresh time interval reduces the number of refresh cycles performed to maintain the data in the memory and thus decreases the memory device power consumption. In addition, because the time during which the refresh cycle occurs is time unavailable for read and write operations of the memory, the less frequent need to perform the refresh operation leaves more overall time available for read and write operations to and from the memory, resulting in improved overall performance of the memory device.

Another factor that affects the overall performance of the memory device is the clock rate at which the memory device operates. In many cases, a faster clock rate allows read operations and write operations to and from the memory to be performed faster than when a slower clock rate is used. However, certain processes, including operations involving the generation of error correction codes for data to be written to the memory, and operations involving masking data to be written to the memory array, may slow down overall memory operational speed. One alternative may be to slow the clock rate so that the column cycle time is slow enough to allow additional operations, including error correction code generation, to be performed. However, slowing the clock rate may increase the overall time required to perform read and write operations to and from the memory, and thus decrease the overall performance and speed of the memory device.

Embodiments described herein provide systems, apparatus, and methods that may permit operations, including error correction code generation for the groups of data bits, and data masking, or both, to be performed at clock rates as fast as those used for read and write operations that do not include these additional processes.

Embodiments may include double rate memory devices, which are memory devices that take in data on both the rising edge and the falling edge of the clock pulse controlling data transfer. In various embodiments including double rate memory devices, data taken in on a rising edge of the clock pulse is written to one part of the memory array included in a memory device, and data taken in on the falling edge of the clock pulse is written to a different part of the memory array. In various embodiments, the data taken in on both the rising edge and on the falling edge of the clock pulse is stored into one or more buffers and then is written to the memory array at the same time.

Embodiments may include a single rate memory device. Single rate memory devices take in data on either a rising edge or a falling edge of a clock pulse, but not both.

In various embodiments, data is received for writing to a memory array at a rate of 5 nanoseconds per group of data bits.

FIG. 1 is a prior art DRAM memory cell or memory bit schematically illustrated generally at 20. Memory cell 20 comprises an access transistor 22 and a capacitor 24. Memory cell 20 is capable of holding binary information in the form of stored charge on capacitor 24. Transistor 22 operates as a switch coupled between capacitor 24 and a digitline 26. Capacitor 24 includes a common node which is biased at approximately Vcc/2 or at the cell plate voltage. The gate that controls the switching action of transistor 22 is coupled to a wordline 28. A logic ONE binary value is stored in memory cell 20 with a plus Vcc/2 charge across capacitor 24. A logic ZERO binary value is stored in memory cell 20 with a minus Vcc/2 charge across capacitor 24. Thus, a node 30, representing the connection between transistor 22 and capacitor 24, is at a potential approximately equal to Vcc when a logic ONE value is stored in memory cell 20 and is at approximately zero or ground level potential when a logic ZERO value is stored in memory cell 20.

Figure 2:
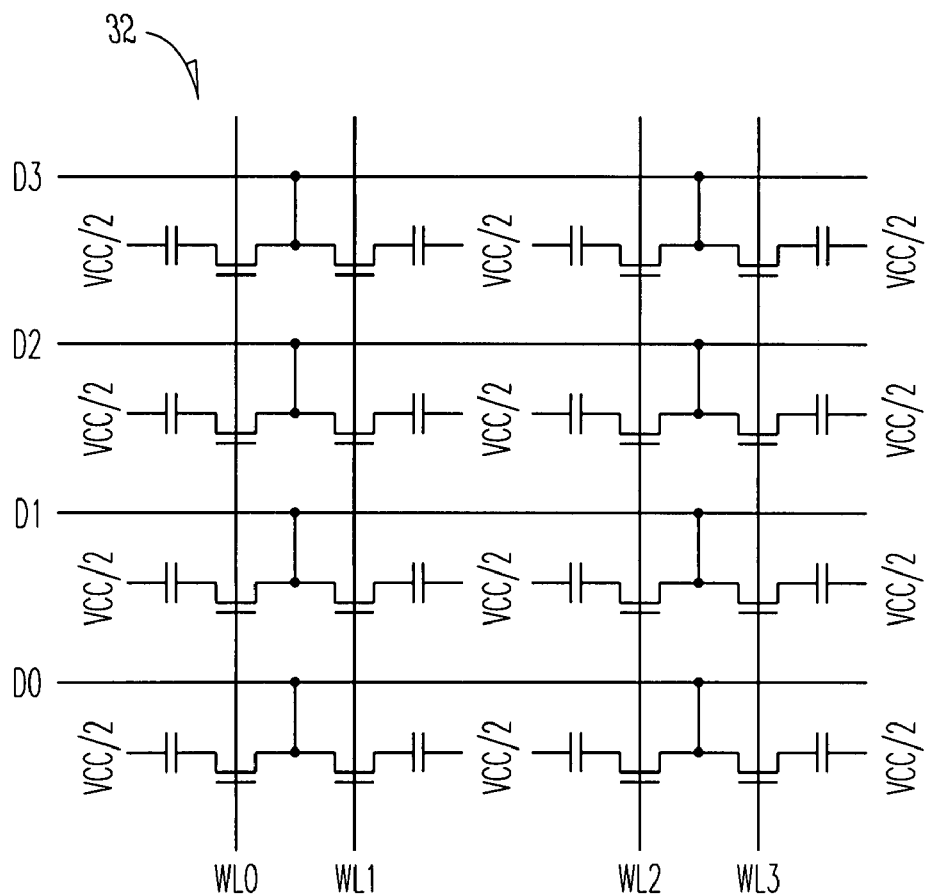
FIG. 2 is a schematic diagram of a prior art simplified memory array structure.

Memory arrays in DRAMs are formed by tiling a large number of memory cells 20 into a memory array structure 32 as schematically illustrated in prior art FIG. 2. In memory array structure 32, the memory cells along a given digitline (D0, D1, D2, or D3) do not share a common wordline (WL0, WL1, WL2, or WL3) and memory cells along a common wordline do not share a common digitline. The simplified diagram of memory array structure 32 in FIG. 2 is for illustrative purposes only to show how one transistor/one capacitor memory cells may be employed in an array structure that is easily scaled. Although the design of the DRAM memory cells and memory arrays may appear simple, their actual design and implementation are highly complex.

Figure 3:
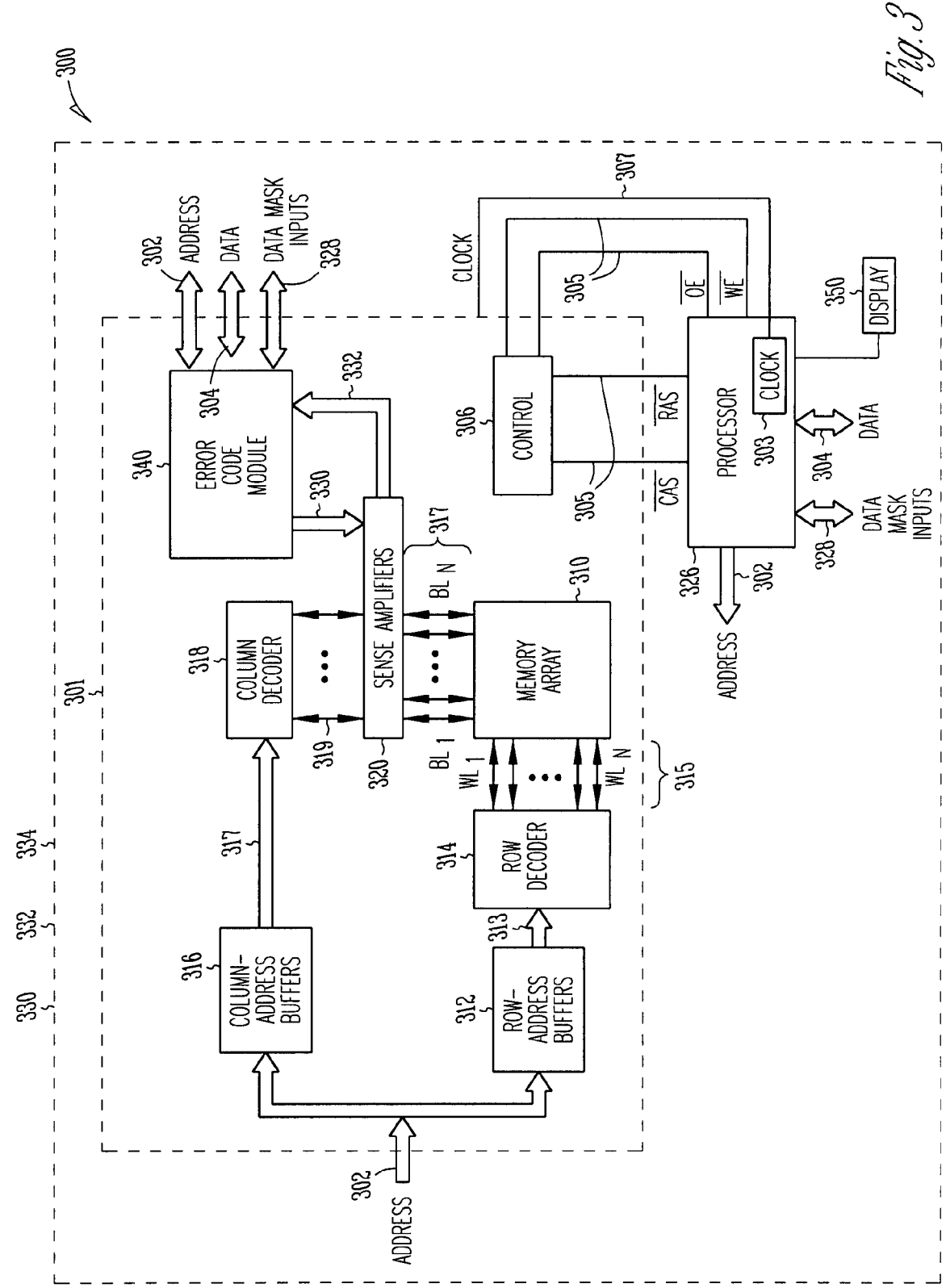
FIG. 3 is a functional block diagram of a system according to various embodiments of the invention.

FIG. 3 is a functional block diagram of a system 300 according to various embodiments of the invention. In some embodiments, the system 100 may comprise a personal digital assistant 330, a camera 102, or a cellular telephone 134. In various embodiments, camera 102 may be a digital camera.

System 300 includes the major components of a memory device, such as a DRAM 301. System 300 may include a processor 326 coupled to the DRAM 301. In various embodiments, system 300 includes a display 350, which in some embodiments may be coupled to processor 326. The description of the memory device of FIG. 3 has been simplified for purposes of illustrating a DRAM memory device incorporating the invention and is not intended to be a complete description of all the features of a memory device. As noted above, other memory devices structures may be readily substituted for the DRAM 301.

Address information to the DRAM 301 is provided on address lines 302, data information is provided on data lines 304, and control input is provided on a variety of control lines 305 directed to a control logic 306. In some embodiments, data masking information associated with the data information is provided on data mask inputs 328.

The DRAM 301 includes a memory array 310 which in turn comprises rows and columns of addressable memory cells. Each memory cell in a row is coupled to a common wordline, as illustrated by lines $WL_1$-$WL_n$ 315. Additionally, each memory cell in a column is coupled to a common bit-lines, as illustrated by lines $BL_1$-$BL_n$ 317. Each cell in the memory array 310 includes a storage capacitor and an access transistor, and may include a number of memory subarrays.

The DRAM 301 may be coupled to, for example, the processor 326, through address lines 302 and data lines 304, and data mask inputs 328. Alternatively, DRAM 301 may be coupled to a DRAM controller, a micro-controller, a chip set or other electronic system. The processor 326 also provides a number of control signals to the DRAM 301 via the control lines 305, including but not limited to, row and column address strobe signals RAS(bar) and CAS(bar), write enable signal WE(bar), an output enable signal OE(bar), a clock signal 307, and other control signals. In various embodiments, processor 326 includes a clock circuit 303 that provides the clock signal 307. In FIG. 3, the "bar" designation and the line over the labels (e.g., $\overline{OE}$, $\overline{WE}$) for these signals indicates that a low logic level equates to an "ON" state. Embodiments are not limited to the use of "bar" signals to indicate an ON state, and any type signals, including but not limited to the inverse of the "bar" signals, may be used in place of the signals as shown in FIG. 3.

A row address buffer 312 and a row decoder 314 receive and decode row addresses from row address signals provided on address lines 302 by, for example, the processor 326. Each row address corresponds to a row of cells in the memory array 310. The row decoder 314 includes a wordline driver, an address decoder tree, and circuitry that translates a given row address received from the row address buffer 312 and selectively activates the appropriate wordline of the memory array 310 via the wordline drivers.

A column address buffer 316 and a column decoder 318 receive and decode column address signals provided on the address lines 302 by the processor 326. Each column address corresponds to a column of cells in the memory array 310. The column decoder 318 is coupled to sense amplifiers 320. In various embodiments, the column decoder 318 is coupled to the sense amplifiers 320 through a plurality of column select lines 319. The sense amplifiers 320 are coupled to bitlines of the memory array 310.

The sense amplifiers 320 are coupled to an error code module 340. In various embodiments, error code module 340 provides data to sense amplifiers 320 through connection 330, and receives data from sense amplifiers 320 through connection 332. Error code module 340 is coupled to the address lines 302 and to the data lines 304. In some embodiments, error code module 340 is coupled to data mask inputs 328. During a write operation, the data lines 304 provide data to the error code module 340. The sense amplifier 320 receives data from the error code module 340, and stores the data in the memory array 310 as a charge on a capacitor of a cell at an address specified on the address lines 302.

During a DRAM read operation, the DRAM 301 transfers data to processor 326 from the memory array 310. Complementary bitlines for the accessed cell are equilibrated during a precharge operation to a reference voltage provided by an equilibration circuit and a reference voltage supply. The charge stored in the accessed cell is then shared with the associated bitlines. A sense amplifier included in the sense amplifiers 320 detects and amplifies a difference in voltage between the complementary bitlines. The sense amplifier passes the amplified voltage to the error code module 340.

The control logic 306 can be used to control the many available functions of the DRAM 301. In addition, various control circuits and signals not detailed herein may be initiated and synchronize the DRAM 301 operation as known to those skilled in the art. As stated above, the description of DRAM 301 has been simplified for purposes of illustrating various embodiments of the invention and is not intended to be a complete description of all the features of a DRAM. Similarly, any mention of other memory structures herein is used to note their use as a substitute for the DRAM 301, and those of ordinary skill in the art will know of the standard operational features for these substitute structures.

Bitlines $BL_1$-$BL_n$ are used to write to and read data from the memory cells within the memory array 310. The wordlines $WL_1$-$WL_n$ are used to access the row of memory cells that is to be written or read. The row decoder 314 and the column decoder 318 selectably access the memory cells in response to address signals provided on the address lines 302 from the processor 326 during write and read operations.

In operation, the DRAM 301 receives an address of a particular memory cell at the error code module 340. For example, the processor 326 may provide the address buffers 312 and 316 with the address for a particular cell within the memory array 310. The row address buffer 312 identifies wordline $WL_1$, for example, for the appropriate memory cell to the row decoder 314. The row decoder 314 selectively activates the wordline $WL_1$ to activate an access transistor of each memory cell connected to the wordline $WL_1$. The column address buffer 316 identifies bitline $BL_1$, for example, for the appropriate memory cell to the column decoder 318. The column decoder 318 selectively connects a particular sense amplifier to the I/O (input/output) bitlines for read or write purposes.

In various embodiments, a plurality of cells, for example the cells coupled to a particular wordline and a plurality of bitlines, for example bitlines $BL_1$-$BL_n$, will be included in an address received on address lines 302. The number of bits in the plurality of bits is not limited to any particular number of bits and may include, for example, 8 bits, 16 bits, or 32 bits. In various embodiments, the data provided on data lines 304 and associated with the address provided on the address lines 302 may include the same number of bits as the number of memory cells addressed by the address provided on address lines 302 when the data bits are provided.

In various embodiments, a provided address will select a number of memory cells that is greater than the number of data bits provided in the data associated with the provided address. In these instances, the additional number of selected memory cells may address memory cells in memory array 310 where an error correction code, including one or more bits, and that is associated with the data stored or to be stored in the memory array 310, is located.

In various embodiments, a set of data masks is provided to the error code module 340 on data mask inputs 328. The set of data masks may be associated with data provided on the data lines 304, wherein the data provided on data lines 304 and associated with the set of data masks is data to be written to memory array 310.

Figure 4:
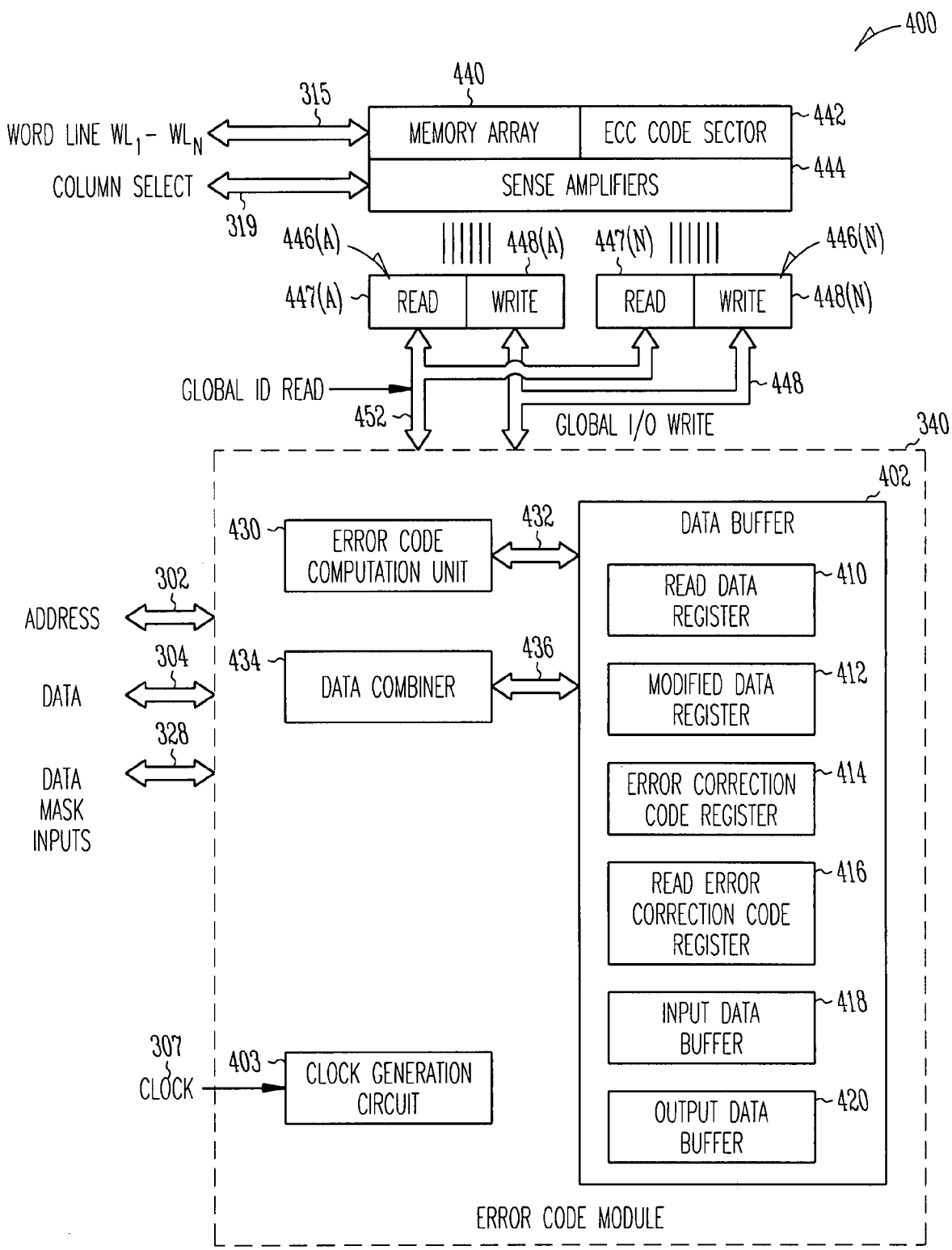
FIG. 4 is an apparatus according to various embodiments of the invention.

FIG. 4 illustrates an apparatus 400 including error code module 340. In various embodiments, error code module 340 includes data buffer 402, error code computation unit 430, and data combiner 434. Data buffer 402 may be coupled to error code computation unit 430 by connection 432. In various embodiments, data buffer 402 may include a plurality of data buffers and registers including, but not limited to: read data register 410, modified data register 412, error correction code register 414, read error correction code register 416, input data buffer 418, and output data buffer 420. These registers and buffers are not limited to any particular type of register or any particular type of buffer, or to any particular length or number of bits. Embodiments are not limited to having a particular register or buffer size for any of the registers and buffers included in data buffer 402, and may include registers and buffers having different sizes.

In various embodiments, error code module 340 includes a clock generation circuit 403. In some embodiments, clock generation circuit 403 receives a clock signal, such as clock signal 307, and generates one or more additional clock signals. In some embodiments, clock generation circuit 403 generates a clock signal that is about twice the cycle rate of the received clock signal 307. In various embodiments, clock generation circuit 403 provides a clock signal used to operate the column cycles as described in further detail herein. Various embodiments include a clock circuit coupled to the processor and operable to generate the plurality of consecutive clock cycles, and a half-cycle clock generation circuit coupled to the clock circuit and to the error code module, the half-cycle clock generation circuit operable to generate a plurality of consecutive clock cycles at a rate of about twice a rate of the clock circuit.

Data buffer 402 may be coupled to data combiner 434 through connection 436. In various embodiments, error code module 340 is coupled to address lines 302, data lines 304, and data mask inputs 328.

Within data buffer 402, the content stored in any of the registers or buffers included in data buffer 402 may be transferred between any other register or buffer included in data buffer 402, either internally within data buffer 402, or externally, outside data buffer 402. in various embodiments, buffers such as input data buffer 418 and output data buffer 420 include input buffers and driver circuitry to provide the capability to receive and to send data to one or more connections to data buffer 402, including but not limited to, address lines 302, data lines 304, data mask inputs 328.

In various embodiments, the registers within data buffer 402 include circuitry to allow the registers to receive data from and to provide data to any memory array, for example memory array 440, to which the data buffer 402 is coupled.

In various embodiments, error code module 340 is coupled to a global read I/O 452 and a global write I/O 450. Global read I/O 452 and global write I/O 450 are not limited to any particular type of I/O and may include any I/O usable to connect to error code module 340. In various embodiments, global read I/O 452 and global write I/O 450 couple error code module 340 to a plurality of local I/O 446(*a-n*). Local I/O 446(*a-n*) represents a plurality of local I/O. Local I/O 446(*a-n*) may include any number of local I/O. Each one of local I/O 446(*a-n*) may include a plurality of individual signal lines. Local I/O 446(*a-n*) is not limited to having each local I/O included in local I/O 446(*a-n*) having the same number of individual signal lines.

In some embodiments, one or more of local I/O 446(*a-n*) includes a read interface 447. Read interface 447 includes an interface for coupling the local I/O signal lines in a particular local I/O 446(*a-n*) to the global read I/O 452 lines. Read interface 447 is shown in FIG. 4 as 447(*a*) and 447(*n*), wherein the letter designation indicates a match of the letter designation of the particular local I/O 446(*a-n*) in which the particular read interface 447 is included. In some embodiments, one or more of local I/O 446(*a-n*) includes a write interface 448. Write interface 448 includes an interface for coupling the local I/O signal lines in a particular local I/O 446(*a-n*) to the global write I/O 450 lines. Write interface 448 is shown in FIG. 4 as 448(*a*) and 448(*n*), wherein the letter designation indicates a match of the letter designation of the particular local I/O 446(*a-n*) in which the particular write interface 448 is included.

In various embodiments, sense amplifiers 444 include a plurality of sense amplifiers coupling the local I/O 446(*a-n*) to the memory array 440. In various embodiments, an ECC code sector 442 may be included in the memory array, and coupled to one or more of the local I/O 446(*a-n*) through sense amplifiers 444. In various embodiments, an error correction code associated with at least one piece of data stored in the memory array may be stored in the ECC code sector 442. In various embodiments, one or more error correction codes associated with data stored in the memory array 440 may be included in the memory array 440 with each of the data stored in the memory array 440. In various embodiments, these one or more error correction codes are stored in the ECC code sector 442 of the memory array 440.

In various embodiments, memory array 440 may be coupled to wordlines $WL_1$-$WL_n$ 315. In various embodiments, sense amplifiers 444 may be coupled to column select lines 319. In some embodiments, wordlines $WL_1$-$WL_n$ 315 and column select lines 319 may be used to control the reading of data from and the writing of data to memory array 440. In various embodiments, the reading and writing includes reading from the memory array and the writing to the memory array of one or more error correction codes. In various embodiments, error code module 340 may control the reading and writing operations of memory array 440 by providing addresses on address lines 302, by providing data on data lines 304, or both.

In operation, error code module 340 may receive data on data lines 304, the data to be written into memory array 440. An address where the received data is to be stored is received on address lines 302. One or more data mask settings associated with the received data may be received on data mask inputs 328. Data mask settings may include an indication associated with each of a plurality of portions of the received data, the data mask settings indicating for each of the plurality of portions of the received data, whether a mask for that particular portion of the received data has been set.

By way of example, data received on data lines 304 may include 32 bits of data and 4 data mask inputs may be received on data mask inputs 328, wherein each of the data mask inputs indicates a data mask setting for one particular byte (8 bits) of the 32 bits. Embodiments are not limited to any particular number of data bits and are not limited to any particular number of data mask inputs for any given number of bits included in the input data. Mask bits may represent data bits, bytes, words, double-words, and other partitions of the data, as desired.

Returning to FIG. 4, in various embodiments the received data may be stored in the input data buffer 418. In various embodiments, the address to which the received data is to be written in the memory array 440 may also be stored in input data buffer 418. Based on the received address, the error code module 340 may read from the memory array the data currently stored at the received address into the read data register 410. The reading of the stored data may occur over the global read I/O 452 lines, and over the local I/O 446 lines associated with the sense amplifiers and the memory array 440 selected by the received address. In some embodiments, an error correction code stored with the read data will also be read and stored in read data register 410. In embodiments including a separate error code sector, such as ECC code sector 442, an error correction code associated with the data read from the memory array 440 will be read from error code sector and may be stored in read data register 410.

In various embodiments, after receiving the stored data and the error correction code at read data register 410, the error code computation unit 430 may compare the read data to the read error correction code associated with the read data, and will determine if an error has occurred in the data. If an error has occurred and can be corrected based on the error correction code, the error code computation unit 430 will provide a correct set of data bits representing the corrected read data to the read data register 410.

In various embodiments, a second set of data bits to be stored into memory array 440 may be received on the data lines 304, including an address where the second set of data bits are to be stored at the address received on address lines 302. In addition, a set of data mask inputs may be received on data mask inputs 328, the set of data mask inputs including data mask settings for the received second set of data bits. The received second set of data bits, along with the associated address and the associated data mask inputs, may be stored in input data buffer 418. Storing the second received set of data bits, along with the associated address and the associated data mask inputs may be stored into input data buffer 418 without removing or affecting any data already stored in input data buffer 418.

In various embodiments, during the time the second data is received, but before the second data is written to the memory array, a read/modify/write process may be performed on the first set of received data. In various embodiments, a reading of the data presently stored in the memory array 440 at the address associated with the second received data may also be performed during the time the read/modify/write process is being performed on the first set of received data bits, as described in more detail in below.

In various embodiments, the read/modify/write process includes the data combiner 434 combining the data stored in the read data register 410 associated with the address received for writing the first received data bits with the data stored in the input data buffer 418 associated with the received first set of data bits. The stored data from the read data register 410 associated with the address of the received first set of data bits may have already had the stored data corrected using the stored error correction code, as described previously. Data combiner 434 may combine the stored data from the read data register 410 with the stored data from the input data buffer 418 based on the data mask settings associated with the received first set of data bits. The data mask settings may include a status for each of a plurality of portions of the stored received first set of data bits, the status indicating whether the set of data bits actually written to memory array 440 will include in each portion the data bits received in the first set of data bits, or the data bits already stored in memory array 440.

By way of example, the received set of data bits stored in the input data buffer 418 may include 32 bits total, including four portions representing 8 bits of the 32 total bits. Data mask inputs may include 4 bits, each of the 4 bits associated with a particular one of the 8-bit portions of the 32 bits. Each of the 4-bit data mask inputs includes a indication as to whether the particular 8-bit portion of the 32 total bits associated with the particular data mask input is to be masked, or is not to be masked. An indication is not limited to any particular type of indication. In various embodiments, the indication is a binary value, for example a binary 1 or a binary 0, wherein the value of the indication determines whether the particular 8-bit portion of the 32 total bits is to be masked or is not to be masked. In various embodiments, a 1 on a data mask input indicates a mask has been set for a particular portion of the 32 total bits, and a 0 on a data mask input indicates that a mask has not been set for a particular portion of the 32 total bits. Other combinations are possible.

In various embodiments, an indication of a mask being set for a particular portion of a plurality of data bits means that rather than using a portion of the data bits received in the plurality of data bits to write to the memory array, the portion of the data bits already stored in the memory array are to be re-written into the memory array for that portion of the plurality of data bits written to the received address. For portions of the plurality of data bits for which a data mask input includes a value indicating that the portion of the plurality of data bits is not to be masked, the data bits written to the memory array for that portion of the plurality of data bits are to include the data bits received in the received set of data bits.

In various embodiments, such as the example above including 32 total data bits and data mask inputs for the four 8-bit portions of the total data bits, the operation is referred to as a "byte-write" because one or more bytes included in the total data bits to be written to a given address in the memory array may be masked on a byte-by-byte basis. It should be understood that masking of data to be written to the memory array is not limited to masking a particular number of bits to a given portion of the total bits. Rather, masking may include masking any number of bits of the total bits, including but not limited to masking each one of the total number of bits on an individual bit-by-bit basis.

Again referring to FIG. 4 and the read/modify/write operation, data combiner 434 completes a modification of the first set of data bits based on the state of the data mask inputs associated with the first set of data bits. The modified first set of data bits includes the received first set of data bits, which may be combined with one or more portions of the first set of data bits stored in the read data register 410 as dictated by the received data mask inputs for the first received set of data bits, the masking being conducted as described above.

The modified first set of data bits may be stored in the modified data register 412. After the modified first set of data bits has been generated, error code computation unit 430 may generate an error correction code associated with the modified first set of data bits, the generated error correction code based on the data bits as provided in the modified first set of data bits. In some embodiments, the generated error correction code associated with the modified first set of data bits may be stored in the error correction code register 414. In some embodiments, the generated error correction code associated with the modified first set of data bits may be added to the data bits included in the modified first set of data bits, forming a plurality of data bits including the modified first set of data bits and the associated error correction code for the modified first set of data bits. In various embodiments, this plurality of data bits including the modified first set of data bits and the associated error correction code for the modified first set of data bits may be stored in the modified data register 412.

Once the modified first set of data bits and the associated error correction code for the modified first set of data bit has been generated, the modified first set of data bits and the associated error correction code maybe written to the memory array 440. In various embodiments, the modified first set of data bits and the associated error correction code are provided by error code module 340 to global write I/O 450, along with the associated address where the provided modified first set of data bits is to be written within the memory array 440. In various embodiments where the associated error correction code is to be written to a different part of the memory array, for example ECC code sector 442, the address where the associated error correction code is to be written may also be provided by error code module 340 to global write I/O 450.

In various embodiments, global write I/O 450 may provide to one or more local I/O 446(*a-n*) the first set of data bits and the associated error correction code to be written to the memory array 440. In various embodiments, global write I/O 450 may provide the first set of data bits to one or more write interfaces 448(*a-n*) for writing of the first set of data bits to memory array 440. In various embodiments, global write I/O 450 will provide the associated error correction code to a different set of write interfaces 448(a-n) than was used to write the first set of data bits, and the different set of write interfaces 448(a-n) may be used for writing the associated error correction code to memory array 440. In various embodiments, the local I/O 446(a-n) used for the writing operation is determined by the particular local I/O 446(a-n) coupled to the locations in memory array 440 that are addressed by the address provided by the error code module 340 in the write operation.

It should be understood that various embodiments may not include global read I/O 452 and global write I/O 450, wherein the local I/O 446(a-n) may be directly coupled to error code module 340. In some embodiments, local I/O 446(a-n) may receive the modified sets of data bits and the associated error correction codes directly from the error code module 340. In various embodiments, the address associated with the modified set of data bits determines which of the local I/O 446(a-n) may be used in performing the write operation of the modified set of data bits and the associated error correction code.

In various embodiments, a read portion of the read/modify/write process for the received second set of data bits may be performed before the writing of the modified first set of data bits (and the associated error correction code for the modified first set of data bits) is performed.

By performing the read portion of the read/modify/write operation for the received first set of data bits, and then performing the read portion of the read/modify/write operation for the received second set of data bits before performing the write operation for the received first set of data bits, additional time may be provided for performing the modify part of the procedure on the received first set of data bits before writing the resulting modified first set of bits to the memory array.

Thus, by interleaving the read/modify/write operations associated with the first set of data bits with the read/modify/write operations associated with the second set of received data bits, the rate at which the data bits may be received can be increased while still providing an adequate time period to process each of the received data sets through the read/modify/write process. In various embodiments, this read/modify/write process includes reading the data already stored at the associated address, checking the read data against the stored error correction code associated with read data, and if necessary, correcting the read data based on the stored error correction code associated with the read data. In various embodiments, the read/modify/write process includes modifying the read data bits based on one or more status values received as data mask inputs associated with the received data bits. In various embodiments, the read/modify/write process includes generation of an error correction code based on the modified set of data bits generated as a result of the data masking.

Figure 5:
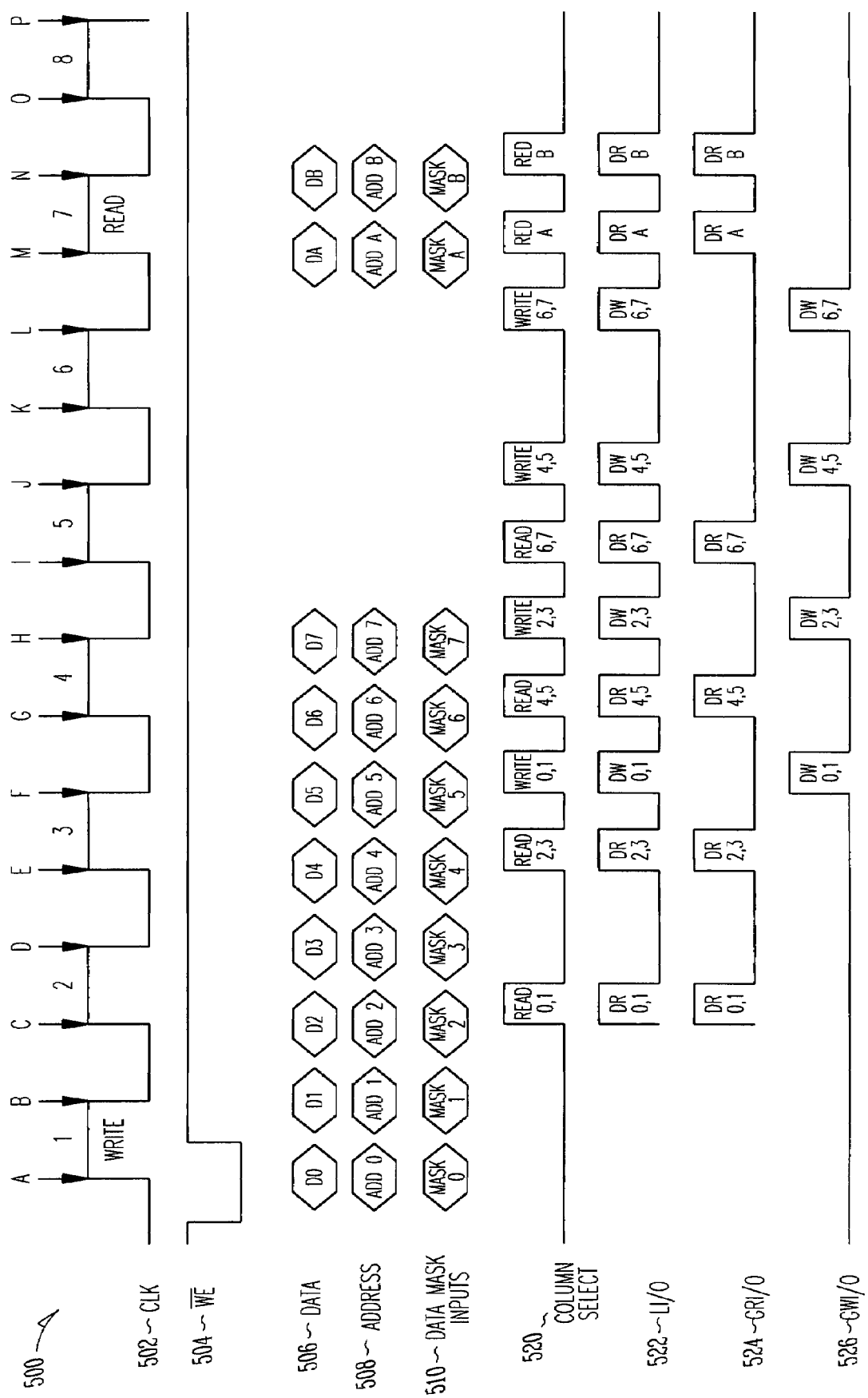
FIG. 5. is a timing diagram including waveforms according to various embodiments of the invention.

In various embodiments, reading the stored data associated with the received second set of data bits from the memory array 440 may be followed by a write operation of the modified first set of data bits to the memory array 440, reading a third set of stored data bits associated with a received third set of data bits from the memory array 440, and then writing the modified set of data bits associated with the received second set of data bits to the memory array 440, as further described with respect to FIG. 5. In various embodiments, the modify and error correction code generation process is performed for the received second set of data at some time after reading the stored data associated with the received second set of data is performed, while the write operation of the modified first set of data bits is performed, and while a read operation of the data stored in the memory array associated with the third set of data is also performed. This interleaving of operations related to different sets of received data may be repeated for any number of sets of received data.

By interleaving the read/modify/write operations, an apparatus such as apparatus 400, including error code module 340, provides the capability to receive sets of data to be written to a memory array at a rapid rate, while still performing error correction on either the read data, on the generated data, or both, as well as performing data masking operations, as described herein.

FIG. 5. is a timing diagram of waveforms 500 according to embodiments of the present invention. Waveforms 500 may be included in the system as shown in FIG. 3. Waveforms 500 may be included in an apparatus as shown in FIG. 4. Waveforms 500 as shown in FIG. 5 include a clock signal 502, a WE(bar) (e.g., $\overline{WE}$) signal 504, a data signal 506, an address signal 508, and a data mask input signal 510. Waveforms 500 as shown in FIG. 5 include column select signal 520, local I/O (LI/O) signal 522, global read I/O (GRI/O) signal 524, and global write I/O (GWI/O) signal 526.

In various embodiments, clock signal 502 may include the clock signal 307 as shown in FIG. 3. In various embodiments, clock signal 307 may be provided by a clock generation circuit 303. In various embodiments, the WE(bar) signal 504 may be similar to or identical to the WE(bar) signal as shown in FIG. 3. In various embodiments, the data signal 506 may be provided to the error code module 340 over data lines 304 as shown in FIG. 3 and FIG. 4. In various embodiments, address signal 508 may be provided to the error code module 340 over address lines 302 as shown in FIG. 3 and FIG. 4, the data mask input signal 510 may be provided over the data mask inputs 328 shown in FIG. 3 and FIG. 4, and the column select signal 520 may be provided over the column select lines 319 as shown in FIG. 3 and FIG. 4. In various embodiments, the LI/O signal 522 may be provided on one or more of the local I/O 446(a-n) as shown in FIG. 4, the GRI/O signal 524 may be provided on global read I/O 452 as shown in FIG. 4, and the GWI/O signal 526 may be provided on global write I/O 450 as shown in FIG. 4.

Again referring to FIG. 5, time periods (a), (b), (c), (d), (e), (f), (g), (h), (i), (j), (k), (l), (m), (n), (o), and (p) are shown. Each of these time periods (a) through (p) occur at about the time of the transition of the clock signal 502. Clock signal 502 is not limited to any particular cycle time, and so the time between time periods (a) through (p) is not limited to any particular amount of time.

In various embodiments, data received and that is to be written into the memory array may be referred to as data bursts. A data burst may refer to the data, for example but not limited to D0, that arrives at the error code module at a particular time. A data burst may include data and an address associated with the data. In some embodiments, an address associated with the data burst may include an address associated with a location where an error correction code associated with the data may be stored. In some embodiments, a data burst may include data mask inputs.

At about time period (a), the transition of clock signal 502 occurs while the WE(bar) signal 504 is pulsed. In various embodiments, this combination of signals indicates that data is to be written into the memory array. At about time period (a), data represented as "D0" is provided on data signal 506, an address "ADD0" associated with "D0" is provided on address signal 508, and data mask inputs "MASK0" associated with "D0" are provided on data mask input signal 510. ADD0 is associated with D0 in that ADD0 includes the address into which data D0 is to be stored. In some embodiments, ADD0 may include an address where an error correction code for D0 is to be stored. In various embodiments, ADD0 may include an address selecting a portion of the memory array where an error correction code associated with the data already stored at the location in the memory array addressed by a data portion of ADD0 included in ADD0 is located in the memory array.

At about time period (b), a transition of clock signal 502 occurs while data signal 506 provides data "D1" and address signal 508 provides address "ADD1" associated with data D1, and data mask input signal 510 provides data mask inputs "MASK1" associated with data D1. Any of these signals may or may not be provided at this time period (b), as desired.

In various embodiments, data D0 and D1, address A0 and A1, and data mask inputs MASK0 and MASK1 may be stored in input data buffers, including but not limited to the input data buffers 418 as shown in FIG. 4. In various embodiments, waveforms 500 are operable in a double data rate device, as previously described, and therefore data D0 and D1 are provided on consecutive transitions of the clock signal 502, and are processed together. Embodiments are not limited to double data rate devices, and in some embodiments, data are provided on a single data by single data basis and are processed on an individual basis as described below for the D0 and D1 data.

At about time period (c), a transition of clock signal 502 occurs while data signal 506 provides data "D2" and address signal 508 provides address "ADD2" associated with data D2, and data mask input signal 510 provides data mask inputs "MASK1" associated with data D2. Any of these signals may or may not be provided at this time period (c), as desired.

Also at about time period (c), column select signal 520 provides a signal to initiate a read from the memory array of the data presently stored in the memory array at the data portions of the addresses include in ADD0 and ADD1. In some embodiments wherein ADD0 and ADD1 include additional addresses indicating locations in the memory array where error correction codes associated with the data location included in data portion of ADD0 and ADD1 are stored, these error correction codes will also be read by addresses provided by column select signal 520.

In various embodiments, the signals provided on column select signal 520 may be applied to the memory array, resulting in data being read from the memory locations indicated by the ADD0 and ADD1 addresses. In various embodiments, this read data may be provided by the LI/O signal 522 at about time period (c). This is shown as "DR 0,1" on LI/O signal 522 beginning about time period (c). In embodiments that include global read I/O lines, the read data may be provided by the LI/O signal 522 to the GRI/O signal 524 at about time period (c) as shown as the DR 0,1" on GRI/O signal 524 beginning at about time period (c). In various embodiment the global read I/O lines are gated to local I/O lines so that any signals provided on LI/O signal 522 are available on GRI/O signal 524, less any delays present in the gating circuits, as would be understood by one of ordinary skill in the art.

In various embodiments, reading the data stored in the memory array indicated by addressed ADD0 and ADD1 beginning at about time period (c) and including the time between time period (c) and (d), represents the read portion of the read/modify/write process performed on data D0 and D1. In various embodiments, during a time period beginning after the data has been read, and up to about time period (f), the modify portion of the read/modify/write process may be performed on data D0 and D1. The modify portion may include any of the processes described above with respect to the error code module providing the data to be written into the memory array, including but not limited to, performing error correction on the initially read data from the memory array, combining received data with the read data using the data mask inputs, and generating an error correction code for the received data, or for a combination of the received data and the read data.

As shown in FIG. 5, and as described above, at about time period (c) additional data, address information, and data masks including data D2, associated addresses ADD2, and associated data mask inputs MASK2 are provided on data signal 506, address signal 508, and data mask input signal 510 respectively. At about time period (d), additional data, address information, and data masks including data D3, associated addresses ADD3, and associated data mask inputs MASK3 are provided on data signal 506, address signal 508, and data mask input signal 510 respectively. In various embodiments, the processing of data D2 and D3 may be done together, in a fashion similar to that described above with respect to data D0 and D1.

The additional data, address information, and data masks concerning data D2 and D3 may be received while the read and the modify processes described for data D0 and D1 are being preformed. In various embodiments, the data D2 and D3, along with the associated addresses ADD2 and ADD3, and associated data mask inputs MASK2 and MASK3 may be stored in an input data buffer, including but not limited to, the input data buffer 418 of error code module 340.

As shown in FIG. 5 at about time period (e), data D2 and D3, and the associated addresses and data mask inputs for D2 and D3 have been received, and column select signal 520 provides a "read 2,3" signal. The read 2,3 signal results in reading from the memory array the data stored at ADD2 and ADD3. The data may be provided over LI/O signal 522, as shown for LI/O signal 522 beginning at about time period (e). Reading the data at ADD2 and ADD3 may happen while the modify process with respect to data D0 and D1 occurs, and before the resulting data associated with D0 and D1 has been written to the memory array. Thus, additional data D2 and D3 is received, and the initial processing including the read portion of the read/modify/write process is performed on additional data D2 and D3 before the data associated with the D0 and the D1 data is written to the memory array.

In various embodiments, at about time period (e) additional data, addresses, and data masks including data D4, associated addresses ADD4, and associated data mask inputs MASK4 are provided on data signal 506, address signal 508, and data mask input signal 510 respectively. Data D4, address(es) ADD4, and data mask inputs MASK4 may be stored in an input data buffer, including but not limited to, the input data buffer 418 of error code module 340.

Returning the FIG. 5, at about time period (f), the read and the modify portion of the read/modify/write process related to data D0 and D1 has been competed, and the data to be written to the memory array at addresses ADD0 and ADD1 are provided to the memory array using the "write 0,1" signal on column select signal 520. In various embodiments, the data to be written to the memory array at address ADD0 and ADD1 is provided as the "DW 0,1" signal on LI/O signal 522 beginning at about time period (f). In various embodiments, the DW 0,1 signal may be provided to the LI/O signal 522 by the GWI/O signal 526, as shown beginning at about time period (f) on the GWI/O signal 526.

In various embodiments, during the time the write operation involving the data associated with the D0 and D1 is being written to the memory array, the modify portion of the read/modify/write process associated with the D2 and the D3 data may also be performed.

At about time period (f), data D5 and associated address ADD5 and associated data mask inputs MASK5 are provided.

At about time period (g), column select lines provide a "read 4,5" signal, causing the data stored at ADD4 and ADD5 of the memory array to be read. As shown in FIG. 5, this reading associated with ADD4 and ADD5 occurs during at time period of only one half of a cycle of clock signal 502 following the writing of the data associated with data D0 and D1 to the memory array, and following the read associated with data D2 and D3. Thus, at about time period (g), a read of data associated with D4 and D5 is beginning while the reading of data associated with data D2 and D3 has occurred, and the modification of data associated the D2 and D3 may be occurring, and before the writing of the data associated with data D2 and D3 has occurred.

At about time period (h), the read and the modify portion of the read/modify/write process related to data D2 and D3 has been completed, and the data to be written to the memory array at addresses ADD2 and ADD3 are provided to the memory array using the "write 2,3" signal on column select signal 520. In various embodiments, the data to be written to the memory array at address ADD2 and ADD3 is provided as the "DW 2,3" signal on LI/O signal 522 beginning at about time period (h). In various embodiments, the DW 2,3 signal may be provided to the LI/O signal 522 by the GWI/O signal 526, as shown beginning at about time period (h) on the GWI/O signal 526.

As shown in FIG. 5, between time the stored data associated with ADD2 and ADD3 is read beginning at about time period (e) and the time when the data to be stored at ADD2 and ADD3 is written to the memory array beginning at about time period (h), two other column cycle operations have occurred, including the write 0,1 operation beginning at about time period (f), and the read 4,5 operation beginning at about time period (g).

As shown in FIG. 5, additional data, such as data D6 and D7, along with additional associated addresses and associated data mask inputs, may be received and processed in a interleaved manner as described above with respect to data D0 and D1, and D2 and D3, and data D4 and D5.

As should be understood from FIG. 5 and from the description provided above, data may be received on each transition of a clock signal, for example clock signal 502, substantially without interruption and while performing a read/modify/write process on each of the received data, even when the read/modify/write process requires a time period that exceeds the time period of a single cycle (two transitions) of the clock signal. By dividing the read/modify/write process for each piece of received data into a first read half and a second write half, and by interleaving the first read half and the second write half with at least a read half from another piece of received data, or at least a write half from another piece of received data, or both a read half and a write half from one or more other data, the read/modify/write process may be completed at clock rate used for a simple read or write operation that does not include error correction codes, or data masking operations, or both, without interrupting the rate of receiving the data. This is accomplished in part by operating the column select signal at a rate of at least twice the cycle rate of the clock signal, and by performing the read/modify/write operation for any one piece of data interleaved with the read/modify/write procedure for other received data.

As shown in FIG. 5, the data transfer for the data read from and written to the memory array may be done using the LI/O signal 522. In some embodiment, the data read for memory array may be transferred using the GRI/O signal 524. In some embodiments, the data written to the memory array may be transferred using the GWI/O signal 526.

As shown in FIG. 5 about time period (l), the last data write to the memory array involving the data associated with data D6 and D7 is begun. Within a half clock cycle at about time period (m), a read request is received, wherein data may to be read from the memory and provided as an output from the memory array.

Figure 6:
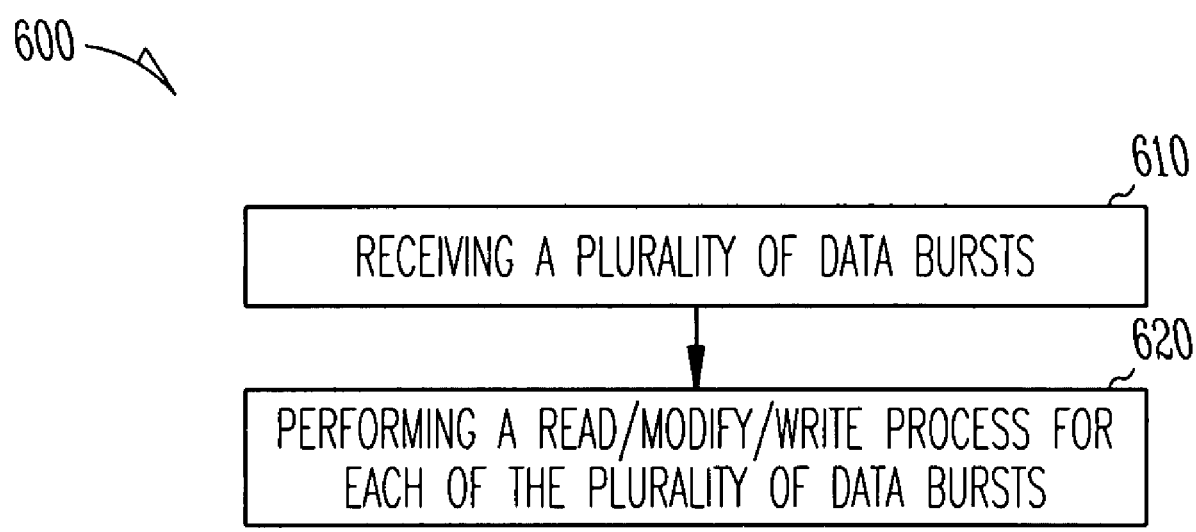
FIG. 6 is a flow diagram illustrating several methods according to various embodiments of the invention.

FIG. 6 is a flow diagram illustrating several methods according to various embodiments of the invention.

Method 600 may include at block 610 receiving a plurality of data bursts to be written to a memory array on a corresponding plurality of consecutive clock cycles.

In some embodiments, receiving a plurality of data bursts may include receiving a first plurality of data bits following a first clock cycle transition of a plurality of consecutive clock cycle transitions, the first plurality of data bits to be written to at least one portion of a group of data bits stored at a first address in a memory array.

In some embodiments, receiving a plurality of data bursts may include receiving a second plurality of data bits following a second clock cycle transition of the plurality of consecutive clock cycle transitions, the second plurality of data bits to be written to at least one portion of a group of data bits stored at a second address in the memory array.

In some embodiments, receiving the second plurality of data bits includes: following the second clock cycle transition and before a fourth clock cycle transition of the plurality of consecutive clock cycle transitions, reading at the second address a second group of stored data bits to generate a second group of read data bits, generating a second group of write data bits by combining the second plurality of data bits with the second group of read data bits, generating a second error correction code for the second group of write data bits, and writing the second group of write data bits to the second address.

Method 600 may include at block 620 performing a read/modify/write process for each of the plurality of data bursts, which may include performing the read/modify/write process within a time period no longer than a period of two cycles of the corresponding plurality of consecutive clock cycles.

In some embodiments, performing the read/modify/write process includes determining an address in the memory array to which a particular data burst being processed is to be written and reading from the address a plurality of stored data bits.

In some embodiments, performing the read/modify/write process includes receiving a data mask associated with the particular data burst being processed, and providing a modified plurality of data bits by including in the modified plurality of data bits any bits from the plurality of stored data bits for which the data mask has been set and any bits from the particular data burst being processed for which the data mask has not been set.

In some embodiments, performing the read/modify/write process includes generating an error correction code for the modified plurality of data bits. In some embodiments, performing the read/modify/write process includes writing the modified plurality of data bits to the address in the memory array and writing the error correction code to the memory array. In some embodiments, writing the error correction code to the memory array includes writing the error correction code to the address in memory array. In some embodiments, writing the error correction code to the memory array includes writing the error correction code to a different address in the memory array.

In some embodiments, performing the read/modify/write process includes following the first clock cycle transition and before a third clock cycle transition of the plurality of consecutive clock cycle transitions: reading at the first address a first group of stored data bits to generate a first group of read data bits, generating a first group of write data bits by combining the first plurality of data bits with the first group of read data bits, generating a first error correction code for the first group of write data bits, and writing the first group of write data bits to the first address.

In various embodiments, reading at the first address may include providing the first address on a plurality of address lines of the memory array and storing the data at the first address provided on a plurality of local input/output lines. In various embodiments, storing the data may include gating the data stored at the first address from the local input/output lines to a plurality of global input/output lines.

In various embodiments, generating a first group of write data bits may include receiving the first group of write data bits, receiving an error code representing a status of the first write group of write data bits at about a time the first group of write data bits was written to the dynamic random access memory array, and determining if any one of the bits included in the first group of write data bits includes an error based on the error code representing a status of the first group of write data bits. Various embodiments may include correcting an error in any one of a plurality of data bits included in the first group of write data bits.

In various embodiments, generating the first group of write data bits may include receiving one or more masking inputs, each masking input associated with a selected portion of the first group of read data bits, and masking the first group of write data bits by including in the first group of write data bits each of the selected portion of the first read group of data bits for which the one or more masking inputs indicates a masking status has been set. Various embodiments may include having in the first group of write data bits each of a selected portion of the first plurality of data bits for which the one or more masking inputs indicates that the masking status has not been set.

In various embodiments, generating a first error code may include generating a Hamming code based on the first group of write data bits. In various embodiments, writing the first group of write data bits may include writing a plurality of error code bits representing the generated first error code for the first group of write data bits to the first address. In various embodiments, writing the first write group of data bits may include writing the first error code to a first error correction code address associated with the first address, wherein the first error correction code address is a different address from the first address.

In various embodiments, performing a read/modify/write process may include providing a first data burst during a first clock cycle and providing a second data burst during a second and consecutive clock cycle, and within a time period no longer than an interval defined by the first clock cycle and the second clock cycle: providing at a local input/output a first plurality of data bits associated with a wordline and a first plurality of column select lines coupled to an array of a memory cells, gating the first plurality of data bits to a global read input/output from the local input/output, clearing the first plurality of data bits from the local input/output after gating the first plurality of data bits to the global read input/output, providing at the local input/output a second plurality of data bits associated with the wordline and a second plurality of column select lines coupled to the array of memory cells, gating the second plurality of data bits to the global read input/output from the local input/output, clearing the second plurality of data bits from the local input/output after gating the second plurality of data bits to the global read input/output, providing a first plurality of write data bits including a plurality of error correction code bits associated with the first plurality of write data bits to a global write input/output, writing the first plurality of write data bits including the error code bits to the array of memory cells associated with the wordline and the first plurality of column select lines through the local input/output after clearing the second plurality of data bits from the local input/output.

Various embodiments may include the first clock cycle having a first clock cycle transition and a second clock cycle transition. Providing of the first plurality of data bits, gating the first plurality of data bits, and clearing the first plurality of data bits may occur during a time period between the first clock cycle transition and the second clock cycle transition.

Various embodiments may include the second clock cycle having a third clock cycle transition and a fourth clock cycle transition. Providing the second plurality of data bits, gating the second plurality of data bits, and clearing the second plurality of data bits may occur during a time period between the third clock cycle transition and the fourth clock cycle transition.

In some embodiments, writing the first plurality of write data bits may include during a time period between the fourth clock cycle transition and an end of the second clock cycle transition: gating the first plurality of write data bits and the error correction code bits from the global write input/output to the local input/output, writing the first plurality of data bits and the error correction code bits to the array of memory cells from the local input/output, and clearing the first plurality of data bits and the error correction code bits from the local input/output.

Embodiments of the invention are not limited to any particular pattern or order in which the various registers are written. It should be understood that other patterns of writing to registers, as determined for example by the instructions included in controller 204, and as included in devices supplying the external signals such as, but not limited to, processor 102 may be used in writing to the registers included in various embodiments of the invention.

It is to be understood that the above description is intended to be illustrative and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

CONCLUSION

Various embodiments have been described herein as a mechanism for effecting an internal read/modify/write process with respect to memory devices including error correction codes and/or masking operations. The process may be conducted internally, using an error correction module coupled to the memory array. In various embodiments, the memory device includes DRAM, and by using error correction codes, the refresh time interval may be lengthened, thereby improving the overall performance of the memory device. In various embodiments, write operations may include data masking so that a read/modify/write process can still be performed at a clock rate wherein the standard read/modify/write process may not be capable of being performed within a single column cycle of the clock rate.

What is claimed is:

1. An apparatus comprising:
a memory array; and
an error code module coupled to the memory array and including a data buffer having a plurality of data registers operable to receive a plurality of data bursts to be written to the memory array on a corresponding plurality of consecutive clock cycles, the error code module operable to perform a read/modify/write process on each of the plurality of data bursts within a time period no longer than a period of two consecutive cycles of the plurality of consecutive clock cycles,
wherein the error code module is further operable to interleave operations of the read/modify/write processes such that read and write operations do not occur simultaneously.

2. The apparatus of claim 1, wherein the error code module comprises a data combiner coupled to the data buffer and operable to generate a modified data burst for each of the plurality of data bursts.

3. The apparatus of claim 2, wherein the error code module comprises a read data register coupled to the memory array and to the data combiner, the read data register operable to receive a plurality of data bits stored at an address in the memory array to which one of the plurality of data bursts is to be written, and to provide the plurality of data bits to the data combiner at about a same time the one of the plurality of data bursts is provided to the data combiner.

4. The apparatus of claim 2, comprising at least one data mask input coupled to the data combiner and operable to provide to the data combiner a data mask setting for each of the plurality of data bursts.

5. The apparatus of claim 2, comprising a modified data register coupled to the data combiner and operable to store the modified data burst.

6. The apparatus of claim 2, wherein the error code module comprises an error code computation unit coupled to the data buffer and operable to generate an error correction code for the modified data burst.

7. The apparatus of claim 6, wherein the error code module comprises an error correction code register coupled to the error code computation unit and operable to store the error correction code.

8. The apparatus of claim 7, comprising a plurality of input/output lines coupled to the error correction code register and to the memory array and operable to provide the error correction code stored at the error correction code register to the memory array.

9. The apparatus of claim 1, comprising a plurality of input/output lines coupled to the error code module and to the memory array, the error code module operable to receive a plurality of read data bits from the memory array and to write a plurality of write data bits to the memory array over the plurality of input/output lines.

10. The apparatus of claim 1, comprising an error code computation unit coupled to a read data register and to a read error code register, the error code computation unit operable to determine if a bit in a plurality of bits read from the memory array and stored in the read data register needs to be corrected based on an error correction code read from the memory array and stored in the read error code register, and to provide the plurality of bits including any corrected bits from the plurality of bits to a corrected data register.

11. The apparatus of claim 10, comprising a data combiner coupled to the corrected data register and to an input data buffer, the corrected data register operable to provide the plurality of bits stored at the corrected data register to the data combiner at about at substantially the same time that the input data buffer at least one of a plurality of data bursts received at the input data buffer to the data combiner.

12. A method comprising:
receiving a plurality of data bursts to be written to a memory array on a corresponding plurality of consecutive clock cycles; and
performing a read/modify/write process for each of the plurality of data bursts within a time period no longer than a period of two cycles of the corresponding plurality of consecutive clock cycles,
wherein each of the read/modify/write processes includes a read operation, a modify operation, and a write operation, and read operations and write operations do not occur simultaneously.

13. The method of claim 12, wherein performing the read/modify/write process for each of the plurality of data bursts includes:
determining an address in the memory array to which a particular data burst being processed is to be written; and
reading from the address a plurality of stored data bits.

14. The method of claim 13, wherein performing the read/modify/write process for each of the plurality of data bursts includes:
receiving a data mask associated with the particular data burst being processed; and
providing a modified plurality of data bits by including in the modified plurality of data bits any bits from the plurality of stored data bits for which the data mask has been set, and any bits from the particular data burst being processed for which the data mask has not been set.

15. The method of claim 14, wherein performing the read/modify/write process for each of the plurality of data bursts includes:
generating an error correction code for the modified plurality of data bits.

16. The method of claim 15, wherein performing the read/modify/write process for each of the plurality of data bursts includes:

writing the modified plurality of data bits to the address in the memory array; and writing the error correction code to the memory array.

17. The method of claim 16, wherein writing the error correction code to the memory array includes:
writing the error correction code to the address in the memory array.

18. The method of claim 16, wherein writing the error correction code to the memory array includes:
writing the error correction code to a different address in the memory array.

19. A method comprising:
receiving a first plurality of input bits and a first address
reading at the first address a first group of stored data bits to generate a first group of read data bits responsive to a first clock cycle transition;
receiving a second group of input bits and a second address;
generating a first group of write data bits by combining the first plurality of input bits with the first group of read data bits;
reading at the second address a second group of stored data bits to generate a second group of read data bits responsive to a second clock cycle transition;
generating a second group of write data bits by combining the second plurality of input bits with the first group of read data bits; and
after reading at the second address, writing the first group of write data bits to the first address before a third clock cycle transition,
wherein said reading at the first address and said writing do not occur simultaneously, and said reading at the second address and said writing do not occur simultaneously.

20. The method of claim 19, further comprising:
after writing the first group of write data bits, receiving a third group of input bits and a third address.

21. The method of claim 20, further comprising:
reading at the third address a third group of stored data bits to generate a third group of read data bits responsive to a third clock cycle transition.

22. The method of claim 19, wherein reading at the first address comprises:
providing the first address on a plurality of address lines of a memory array; and
receiving at a data buffer the first group of stored data bits provided on a plurality of local input/output lines.

23. The method of claim 22, wherein reading at the first address further comprises:
gating the first group of stored data bits from the plurality of local input/output lines to a plurality of global input/output lines.

24. The method of claim 19, wherein generating a first group of write data bits comprises:
receiving the first group of read data bits;
receiving an error correction code representing a status of the first group of read data bits at about a time the first group of read data bits was written to the memory array; and
determining if any individual bits included in the first group of read data bits includes an error based on the error correction code representing a status of the first group of read data bits.

25. The method of claim 24, further comprising:
correcting an error in any one of a plurality of data bits included in the first group of write data bits.

26. The method of claim 19, wherein generating the first group of write data bits comprises:

receiving a masking input associated with a selected portion of the first group of read data bits; and
masking the first group of write data bits by including in the first group of write data bits the selected portion of the first group of read data bits for which the masking input indicates a masking status has been set.

27. The method of claim 26, comprising:
including in the first group of write data bits a selected portion of the first plurality of data bits for which the masking input indicates that the masking status has not been set.

28. The method of claim 24, wherein the error correction code comprises a Hamming code based on the first group of write data bits.

29. The method of claim 19, wherein writing the first group of write data bits comprises:
writing a plurality of error correction code bits representing the first error correction code for the first group of write data bits to the first address.

30. The method of claim 19, wherein writing the first group of write data bits comprises:
writing the first error correction code to a first error code address associated with the first address, wherein the first error code address is a different address from the first address.

31. A method comprising:
providing a first data burst during a first clock cycle and providing a second data burst during a second and consecutive clock cycle; and
within a time period no longer than an interval defined by the first clock cycle and the second clock cycle:
receiving a first plurality of data bits corresponding to the first data burst;
receiving a second plurality of data bits corresponding to the second data burst;
combining the first data burst and the first plurality of data bits to generate a plurality of write data bits;
after combining, storing the plurality of write data bits;
after storing, generating a plurality of error correction code bits associated with the plurality of write data bits; and
writing the plurality of write data bits and the plurality of error correction code bits to an array of memory cells.

32. The method of claim 31, wherein the first clock cycle includes a first clock cycle transition and a second clock cycle transition, and unsaid receiving a first plurality of data bits occurs during a time period between the first clock cycle transition and the second clock cycle transition.

33. The method of claim 31, wherein said receiving a first plurality of data bits comprises:
outputting the first plurality of data bits from a memory array to the local input/output;
gating the first plurality of data bits from a local input/output to a global read input/output; and
storing the first plurality of data bits.

34. The method of claim 33, wherein writing the first plurality of write data bits comprises:
coupling the first plurality of write data bits and the plurality of error correction code bits from the global write input/output to the local input/output; and
writing the first plurality of data bits and the plurality of error correction code bits to the array of memory cells from the local input/output.

35. A system comprising:
a processor coupled to a memory array, the processor operable to provide a plurality of data bursts to be written to the memory array on a corresponding plurality of consecutive clock cycles, and a data mask for each of the plurality of data bursts; and an error code module coupled to the processor and to the memory array, the error code module operable to receive the plurality of data bursts and to perform a read/modify/write process for each of the plurality of data bursts within a time period no longer than a period of two cycles of the plurality of consecutive clock cycles, wherein the error code module is further operable to interleave operations of the read/modify/write processes such that read and write operations do not occur simultaneously.

36. The system of claim 35, wherein the error code module includes:

a plurality of data mask inputs coupled to a data combiner, the plurality of data mask inputs operable to receive the data mask for each of the plurality of data bursts, the data combiner operable to receive individually each one of the plurality of data bursts and to modify each one of the plurality of data bursts to generate a modified data burst based on the data mask for each of the plurality of data bursts.

37. The system of claim 36, wherein the error code module includes:

an error code computation unit coupled to the data combiner, the error code computation unit operable to receive the modified data burst and to provide an error correction code based on the modified data burst.

38. The system of claim 35, including a plurality of input/outputs coupled to the memory array and to the error code module.

39. The system of claim 38, wherein the plurality of input/outputs includes a plurality of local input/outputs coupled to a plurality of addressable groups of memory cells included in the memory array, and wherein each of the plurality of addressable groups of memory cells is coupled to at least one of the plurality of local input/outputs.

40. The system of claim 39, including:

at least one global read input/output coupled to the plurality of local input/outputs and to a read data register included in the error code module, the at least one global read input/output operable to provide a plurality of data bits stored at any one of the plurality of addressable groups of memory cells to the read data register.

41. The system of claim 39, including:

at least one global write input/output coupled to the plurality of local input/outputs and to one or more registers included in the error code module, the at least one global write input/output operable to provide a modified data burst and an error correction code associated with the modified data burst to at least one of the plurality of addressable groups of memory cells.

42. The system of claim 35, wherein the memory array includes a plurality of memory cells and a plurality of wordlines, each one of the plurality of wordlines coupled to a selected group of the plurality of memory cells.

43. The system of claim 35, wherein the error code module includes a data combiner coupled to a data burst register and to a read data register, the data burst register operable to receive the plurality of data bursts, and the read data register coupled to the memory array and operable to receive data stored at an address in the memory array where a selected one of the plurality of data bursts is to be written.

44. The system of claim 35, including:

a clock circuit coupled to the processor and operable to generate the plurality of consecutive clock cycles, and a half-cycle clock generation circuit coupled to the clock circuit and to the error code module, the half-cycle clock generation circuit operable to generate a plurality of consecutive clock cycles at a rate of about twice a rate of the clock circuit.

45. The system of claim 35, wherein the memory array includes dynamic random access memory.

46. The system of claim 35, wherein the memory array is included in a camera.

47. The system of claim 35, wherein the error code module includes a combiner configured to combine data bursts and data stored in the memory array corresponding to the data burst.

48. The system of claim 35, wherein the memory array is included in a cell phone.

* * * * *

UNITED STATES PATENT AND TRADEMARK OFFICE
CERTIFICATE OF CORRECTION

| | | |
|---|---|---|
| PATENT NO. | : 7,945,840 B2 | Page 1 of 1 |
| APPLICATION NO. | : 11/705190 | |
| DATED | : May 17, 2011 | |
| INVENTOR(S) | : Schreck et al. | |

It is certified that error appears in the above-identified patent and that said Letters Patent is hereby corrected as shown below:

In column 24, line 47, in Claim 32, delete "unsaid" and insert -- said --, therefor.

Signed and Sealed this
Twelfth Day of July, 2011

David J. Kappos
*Director of the United States Patent and Trademark Office*